United States Patent [19]
Kim et al.

[11] Patent Number: 5,606,451
[45] Date of Patent: Feb. 25, 1997

[54] ELECTRODISPLACIVE ACTUATOR ARRAY AND METHOD FOR THE MANUFACTURE THEREOF

[75] Inventors: Yong-Kwang Kim; Dong-Kuk Kim, both of Seoul, Rep. of Korea

[73] Assignee: Daewoo Electronics Co., Ltd., Seoul, Rep. of Korea

[21] Appl. No.: 216,756

[22] Filed: Mar. 23, 1994

[30] Foreign Application Priority Data

Mar. 23, 1993 [KR] Rep. of Korea ............... 93-4518
Aug. 30, 1993 [KR] Rep. of Korea ............. 93-17047

[51] Int. Cl.$^6$ ........................................... G02B 26/00
[52] U.S. Cl. ................. 359/290; 359/291; 359/295; 359/849; 359/850
[58] Field of Search ............................. 359/290, 291, 359/295, 849, 850

[56] References Cited

U.S. PATENT DOCUMENTS

| | | | |
|---|---|---|---|
| 3,479,109 | 12/1964 | Preston, Jr. ................... | 359/290 |
| 3,796,480 | 3/1974 | Preston, Jr. et al. ............. | 359/290 |
| 3,904,274 | 9/1975 | Feinleib et al. ................ | 359/290 |
| 4,150,876 | 4/1979 | Yevick ......................... | 359/291 |
| 4,418,346 | 11/1983 | Batchelder .................... | 350/357 |
| 4,714,326 | 12/1987 | Usui et al. .................... | 350/485 |

*Primary Examiner*—Timothy P. Callahan
*Assistant Examiner*—T. Lam
*Attorney, Agent, or Firm*—Anderson, Kill & Olick P.C.

[57] ABSTRACT

An array of electrodisplacive actuators is prepared by first forming on an electrodisplacive ceramic wafer a plurality of regularly spaced vertically directional trenches running parallel to each other, followed by forming a first conductive metallic layer thereon. A multiplicity of regularly spaced horizontally directional trenches running parallel to each other and running normal to the plurality of vertically directional trenches is then formed on the thus prepared ceramic wafer. A ceramic block having a top and a bottom surfaces is then formed by bonding together two ceramic wafers, prepared using the above described procedures. The top and the bottom surfaces of the ceramic block are removed until the first conductive metallic layer is exposed, and then a series of regularly spaced vertically directional grooves is formed thereon. Finally, a second conductive metallic layer is deposited on a bottom and side surfaces of each of the grooves to thereby form the array of electrodisplacive actuators.

7 Claims, 8 Drawing Sheets

ELECTRODISPLACIVE ACTUATOR ARRAY AND METHOD FOR THE MANUFACTURE THEREOF

FIELD OF THE INVENTION

The present invention relates to an optical projection system; and, more particularly, to an improved method of manufacturing an array of electrodisplacive actuators for use in the system.

BACKGROUND OF THE INVENTION

Among the various video display systems available in the art, an optical projection system is known to be capable of providing a high quality display in a large scale. In such an optical projection system, light from a lamp is uniformly illuminated onto, e.g., an array of M×N mirrors. The array of M×N mirrors is mounted on an array of actuators which includes a corresponding number, i.e., M×N, of actuators such that each of the mirrors is coupled with each of the actuators. The actuators are made of an electrodisplacive material such as piezoelectric or electrostrictive material which deforms in response to an electric field applied thereto.

When a reflected light beam from each of the mirrors is incident upon an aperture of a baffle, by applying an electrical signal to each of the actuators, the relative position of each of the mirrors to the incident light beam becomes altered, thereby causing a deviation in the optical path of the reflected beam from each of the mirrors. As the optical path of each of the reflected beam is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

Each of the actuators for use in the above-described optical projection system is conventionally made of multiple layers of an electrodisplacive material which are made to deform by the application of an electric field between them.

The multiple layer structure used in such actuators has been normally manufactured by: (1) producing layers of electrodisplacive material having a specified thickness by tape casting a slurry thereof, (2) coating on one side of the individual layers with an electrically conductive material in a pattern to produce an electrode of predetermined dimensions in the completed actuators, (3) stacking the layers of electrodisplacive material coated on one side thereof with a specific electrode pattern and pressing into a block, (4) sintering the block while it is held under pressure, and (5) dicing the sintered block to produce the multiple layer structure.

The electrode patterns in alternating layers are then externally connected to permit an electric field to be generated between the layers of electrodisplacive material.

There is a number of problems associated with the prior art manufacturing method described above, however. First of all, the complicated nature of the process often results in producing one or more defective layers which fail to exhibit the desired mechanical deformation characteristics. In addition, the presence of continuity defects in the electrode patterns may force the scrapping of such defective actuators, entailing wasted materials and labor spent in the fabrication and quality control test thereof.

Another problem present in the prior art method is that it requires expensive electrode materials having high melting points such as platinum(Pt) or palladium(Pd) so as for the electrode pattern to withstand an extremely high sintering temperature, e.g., 1,250° C. or higher.

SUMMARY OF THE INVENTION

It is, therefore, a primary object of the present invention to provide a method for manufacturing an array of electrodisplacive actuators without using a multiple number of layers of electrodisplacive material, thereby simplifying and facilitate the manufacturing process.

It is another object of the present invention to provide a method for manufacturing an array of electrodisplacive actuators without employing a costly electrode material having a high melting point.

In accordance with one aspect of the present invention, there is provided a method for manufacturing an array of electrodisplacive actuators for use in an optical projection system, comprising the steps of:

(a) preparing a first ceramic wafer made of an electrodisplacive material and having a flat surface;

(b) forming on the entirety of said flat surface of said first ceramic wafer a plurality of regularly spaced vertically directional trenches wherein each of said vertically directional trenches has a pair of side surfaces and a bottom surface, and runs parallel to each other;

(c) depositing a first conductive metallic layer on the entirety of said flat surface shaped in step(b), including the side surfaces and the bottom surface of each of said vertically directional trenches, resulting in a ceramic body;

(d) forming on said ceramic body a multiplicity of regularly spaced horizontally directional trenches wherein each of said horizontally directional trenches has a pair of side surfaces and a bottom, and runs parallel to each other in a direction normal to said plurality of vertically directional trenches;

(e) preparing a second ceramic wafer made of said electrodisplacive material and having a flat surface;

(f) treating said second ceramic wafer in accordance with said steps(b), (c) and (d);

(g) bonding said first and second ceramic wafers treated in accordance with said steps(b), (c), and (d) by using an adhesive to thereby form a ceramic block having a top and a bottom surfaces;

(h) removing said top and bottom surfaces of said ceramic block so as to obtain a pair of flat surfaces thereof until said first conductive metallic layer deposited on the side surfaces of said vertically directional trenches prepared in said step(b) is exposed, resulting in a composite structure wherein said electrodisplacive material is separated in the vertical direction by said first conductive metallic layer and in the horizontal direction by said adhesive;

(i) forming a series of regularly spaced vertically directional grooves on one of said flat surfaces obtained in said step(h) wherein each of said grooves has a pair of side surfaces and a bottom surface, runs parallel to each other and is located at an equidistance from two adjacent layers of said first conductive metallic layers; and (j) depositing a second conductive metallic layer on said side and bottom surfaces of each of said series of grooves to thereby prepare said array of electrodisplacive actuators.

In accordance with another aspect of the invention, there is provided a method for manufacturing an array of electrodisplacive actuators wherein the electrode material is made of either aluminum or silver.

BRIEF DESCRIPTION OF THE DRAWINGS

The above and other objects, and features of the present invention will become apparent from the following description of preferred embodiments given in conjunction with the accompanying drawings, wherein.

DETAILED DESCRIPTION OF THE PREFERRED EMBODIMENTS

Figure 1A:
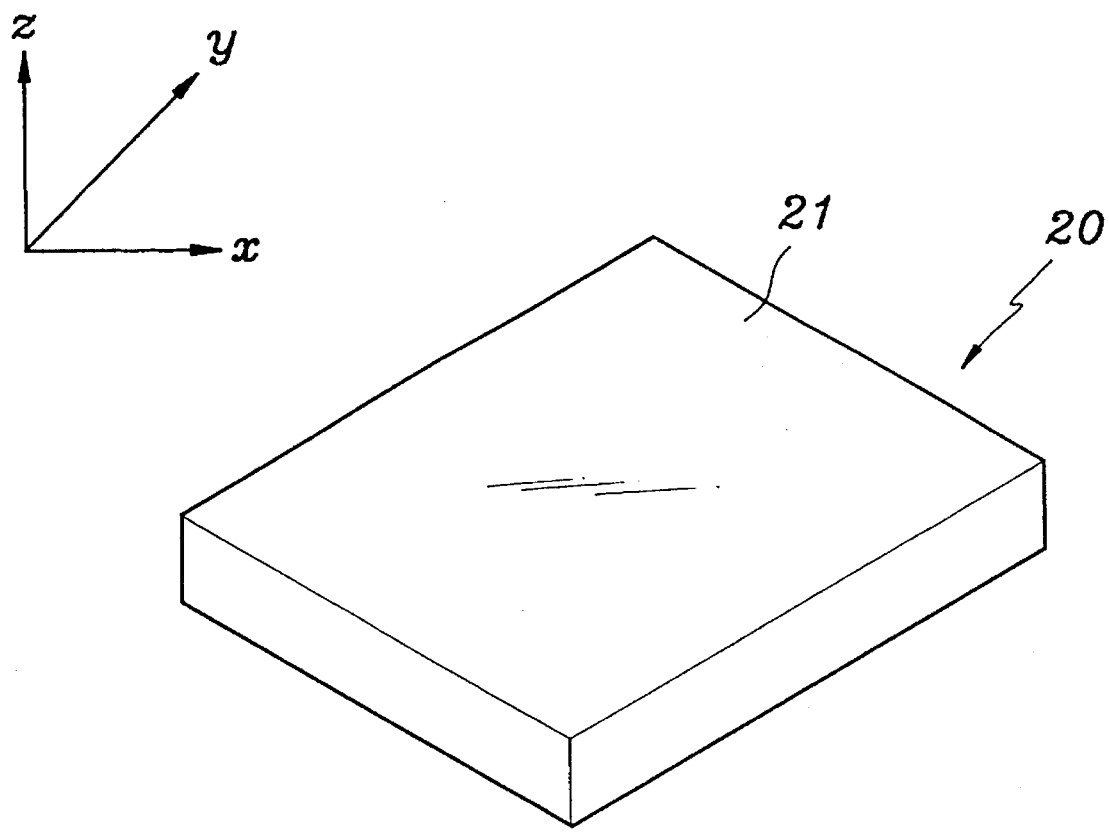
FIGS. 1A to 1K illustrate the steps used in constructing an array of electrodisplacive actuators in accordance with the present invention.

In accordance with the present invention, the process for manufacturing the inventive array of electrodisplacive actuators begins with the preparation of a first ceramic wafer 20, made of an electrodisplacive material, e.g., lead magnesium niobate, and having a flat surface 21 as shown in FIG. 1A. The first ceramic wafer 20 can easily be prepared, for example, by slicing a sintered ceramic body. In the case of an array of piezoelectric actuators, there is required an additional constraint: that is, the polarization direction thereof be parallel to the x-axis shown in FIG. 1A.

The three axes defined in FIGS. 1A to 1K, namely x-, y- and z-axis, are three mutually perpendicular axes.

Figure 1B:
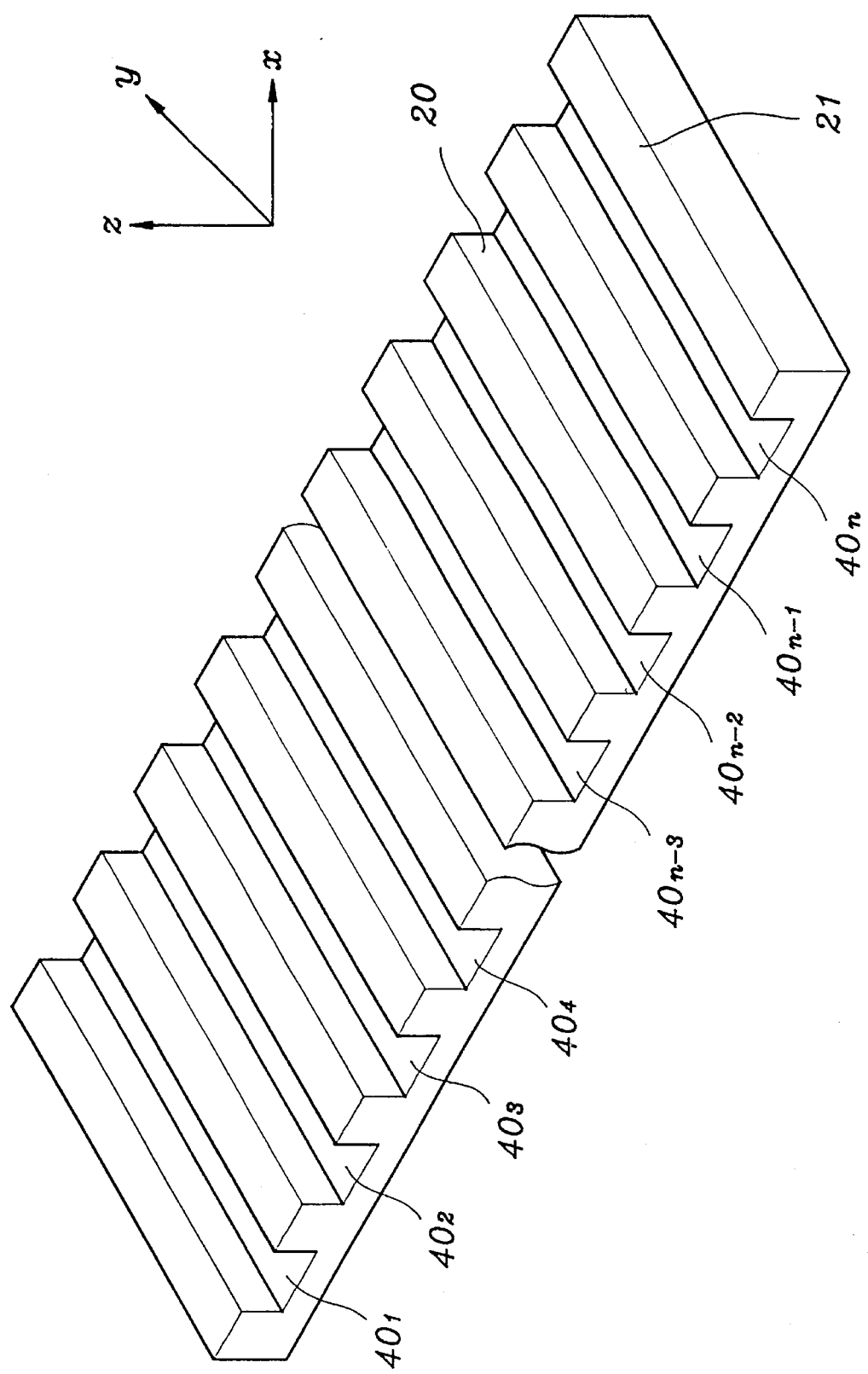
Figure 1C:
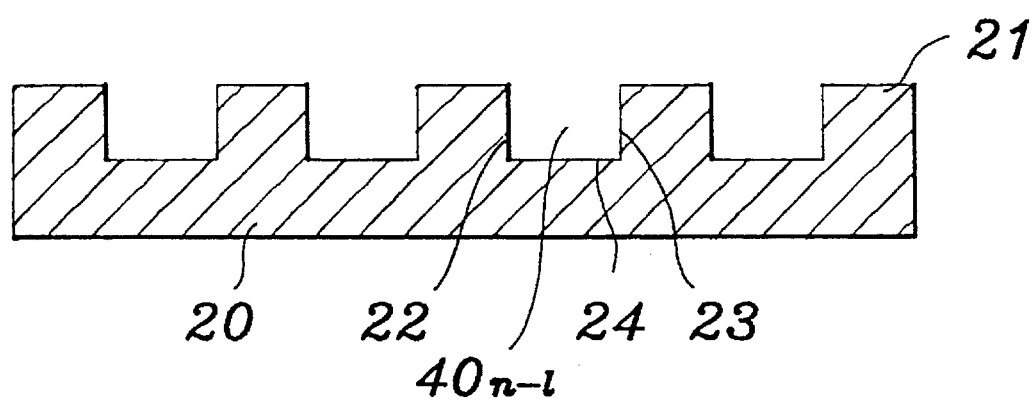

Thereafter, as shown in FIGS. 1B and 1C, there is formed on the entire flat surface 21 a plurality of regularly spaced y-directional trenches $40_n$ of an identical size, having substantially square edges, running parallel to each other and to the y-axis, wherein each of the trenches has two side surfaces 22, 23 and a bottom surface 24. FIGS. 1B and 1C illustrate the perspective and cross sectional views, respectively, of the ceramic wafer 20 after the above-described step has been completed.

Figure 1D:
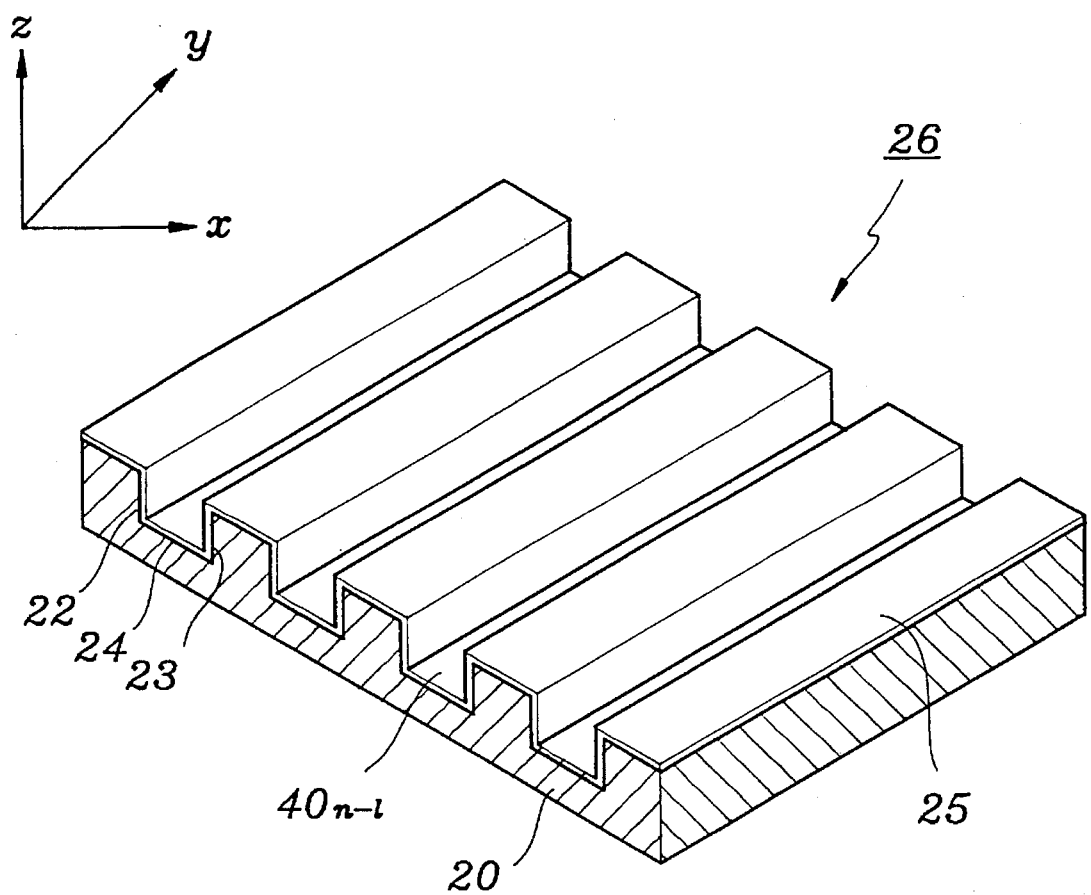

In the subsequent step, a first conductive metallic layer 25 comprising either aluminum(Al) or silver(Ag) is formed on the entire surface, including the side surfaces 22, 23 and the bottom surface 24 of the trenches $40_n$, treated in the previous step by using such a conventional technique as sputtering or thermal evaporation, resulting in a first ceramic body 26 covered with the first conductive metallic layer 25 as shown in FIG. 1D.

Figure 1E:
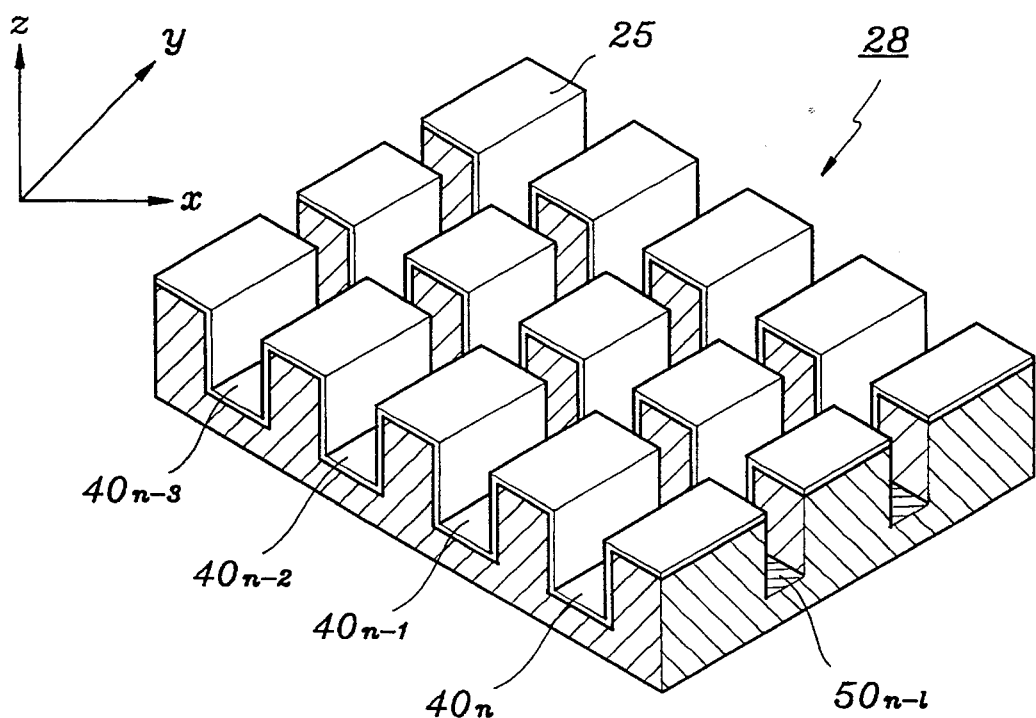

Thereafter, in order to separate the first conductive metallic layer 25 deposited on the ceremic body 26 in the direction parallel to the x-axis, there is formed on the first ceramic body 26 a multiplicity of regularly spaced x-directional trenches $50_n$ of an identical size, having substantially square edges, running parallel to each other in the direction normal to the plurality of y-directional trenches $40_n$, resulting in a first ceramic structure 28 having criss-crossed, regularly spaced y- and x-directional trenches $40_n$, $50_n$, wherein the depth of the trenches $50_n$ is equal to or greater than that of the trenches $40_n$ as shown in FIG. 1E.

In the subsquent step, a second ceramic wafer 29, made of the same electrodisplacive material as the first ceramic wafer 20 and having a flat surface, is processed using the above-described procedures in such a way that a second ceramic structure 31 is formed to have the identical top surface morphology as the first ceramic structure 28 so that it can be fitted thereto.

Figure 1F:
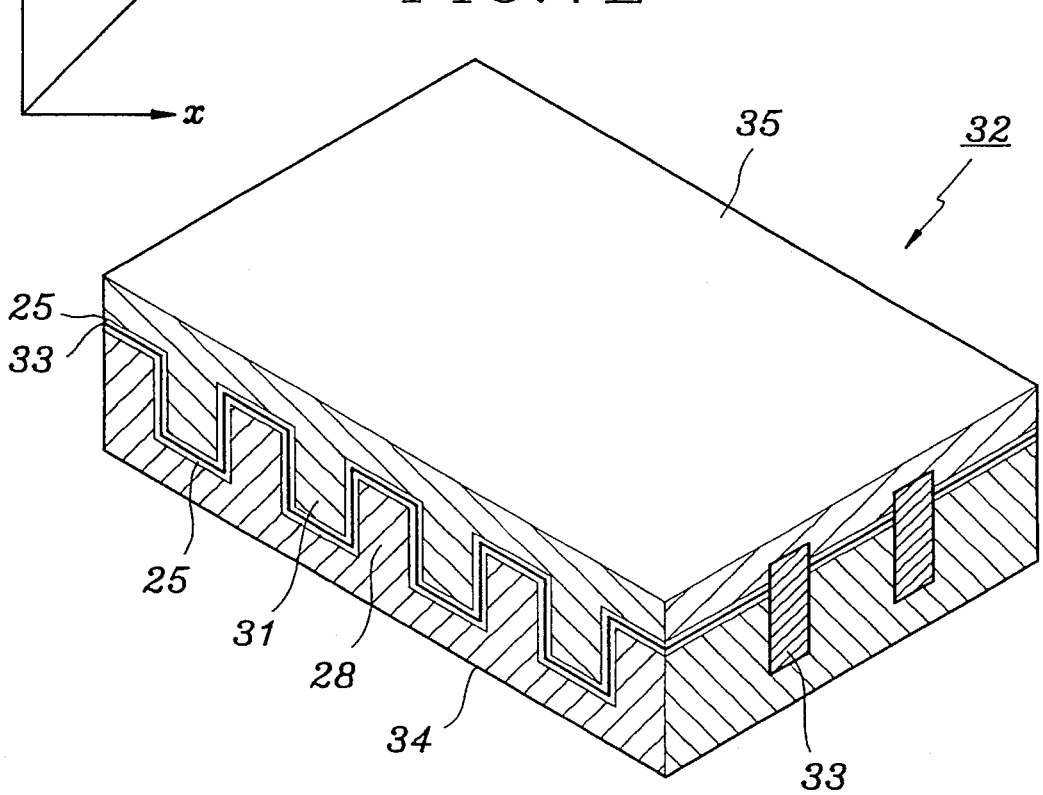

The two ceramic structures 28, 31 are interlocked and bonded to form a ceramic block 32 having a top and a bottom surfaces 34, 35 by using a non-conductive adhesive 33 as shown in FIG. 1F.

Figure 1G:
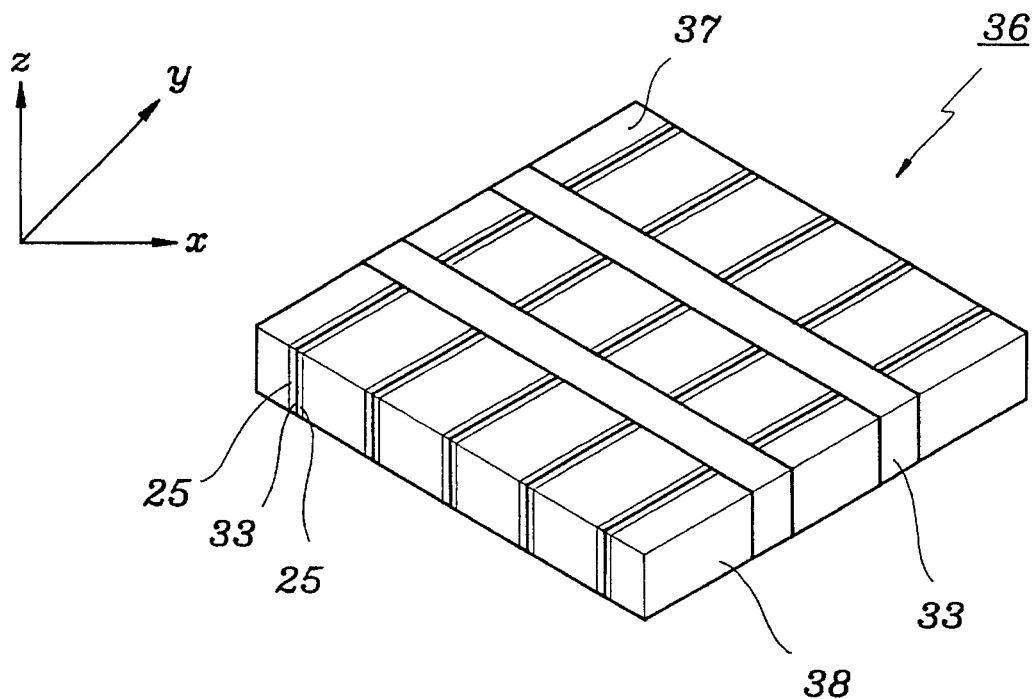

Thereafter, the top and the bottom surfaces 34, 35 of the ceramic block 32 are removed until the first conductive metallic layer 22 deposited on the side surfaces 22, 23 of the y-directional trenches $40_n$ is exposed, resulting in a composite structure 36 having a top and a bottom surfaces 37, 38 as shown in FIG. 1G wherein the electrodisplacive material is separated systematically by the first conductive metallic layer 25 in the y-direction and by the non-conductive adhesive 33 in the x-direction.

Figure 1H:
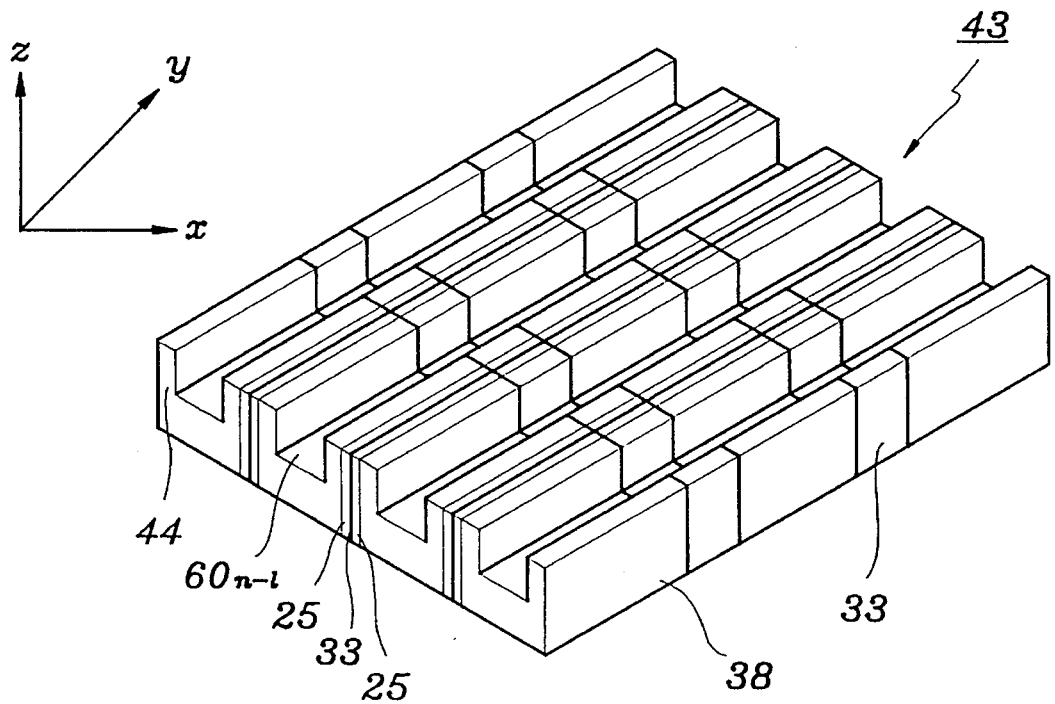
Figure 1I:
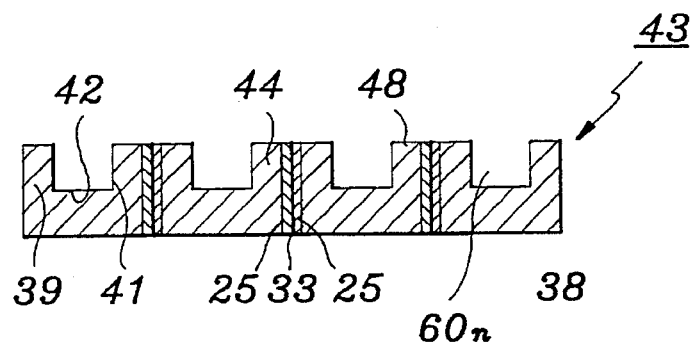

As shown in FIGS. 1H and 1I, in the subsquent step, there is formed on the entire top surface 37 of the composite structure 36 a multiplicity of regularly spaced grooves $60_n$ of an identical size, running in parallel to the y-axis, resulting in a composite body 43. Furthermore, each of the grooves is located at an equidistance from two adjacent layers of the first conductive metallic layers 25, has two side surfaces 39, 41 and a bottom surface 42, and is separated by a barrier 44 having a top surface 48. FIG. 1H represents the perspective view of the composite structure 36; and FIG. 1I, the cross sectional view thereof.

Figure 1J:
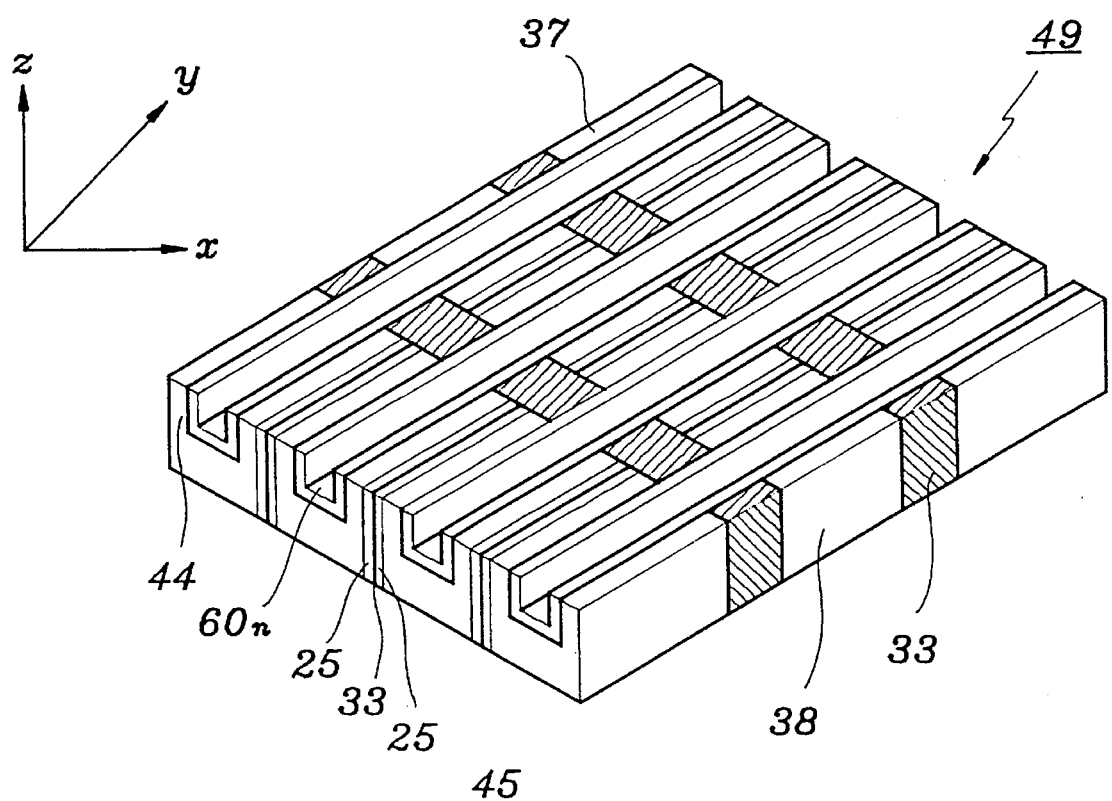
Figure 1K:
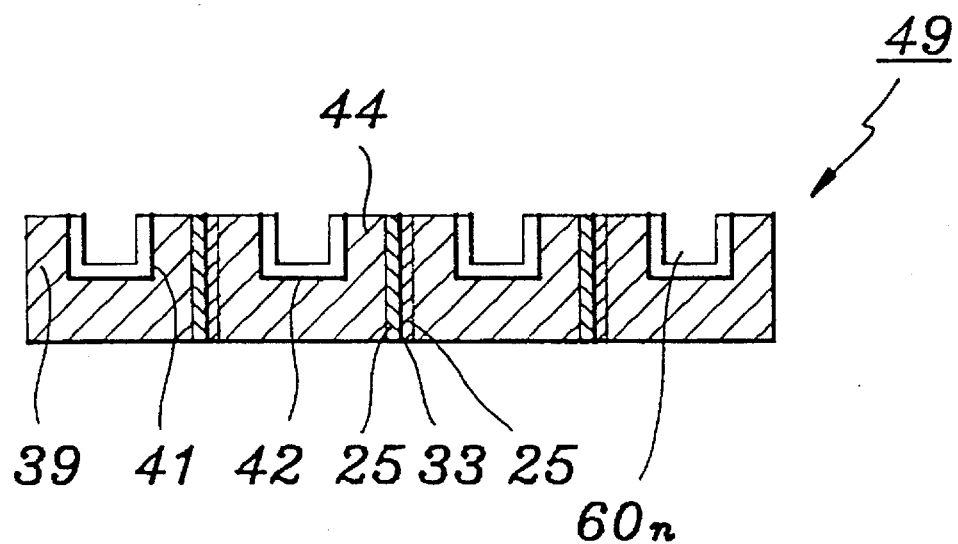

A second conductive metallic layer 45, comprising either silver(Ag) or aluminum(Al), is formed on the side surfaces 39, 41 and the bottom 42 of each of the grooves $60_n$, by first depositing a second metallic layer on the entire top surface of the composite body 43 including the side surfaces 39, 41 and the bottom 42 of each groove $60_n$ and the top surface 48 of each barrier 44, and then removing the second metallic layer on the top surface 48, resulting in an array 49 of electrodisplacive actuators as shown in FIGS. 1J and 1K, wherein each of the electrodisplacive actuators in the array 49 corresponds to each of the barriers 44.

FIGS. 1J and 1K illustrate the perspective and cross-sectional views, respectively, of the array 49.

The array 49 of electrodisplacive actuators is then mounted on a substrate such that the first and the second conductive metallic layers 25, 45 function as the signal and reference electrodes, respectively, and therefore the first conductive metallic layer 25 is connected to a driver and the second conductive metallic layer 45 is interconnected to a common ground potential(not shown).

When a voltage is applied between the first conductive metallic layer 25 and the second conductive metallic layer 45, the electrodisplacive material located between them will deform in a direction determined by the polarity of the voltage.

In order for the array 49 shown in FIGS. 1J and 1K to be used as an actuated mirror array in an optical projection system, said mirrors must be attached together.

In this connection, there is disclosed a method for attaching the mirrors in a copending, commonly owned application, U.S. Ser. No. 08/216,755, entitled "MIRROR ARRAY AND METHOD FOR MANUFACTURE THEREOF", which is incorporated herein by reference.

While the present invention has been shown and described with reference to the particular embodiments, it will be apparent to those skilled in the art that many changes and modification may be made without departing from the spirit and scope of the invention as defined in the appended claims.

What is claimed is:

1. A method for manufacturing an array of electrodisplacive actuators for use in an optical projection system, comprising the steps of:

(a) preparing a first ceramic wafer made of an electrodisplacive material and having a flat surface;

(b) forming on the entirety of said flat surface of the first ceramic wafer a plurality of regularly spaced vertically directional trenches wherein each of said vertically directional trenches has a pair of side surfaces and a bottom surface, and runs parallel to each other;

(c) depositing a first conductive metallic layer on the entirety of said flat surface shaped in step(b), including the side surfaces and the bottom surface of each of said vertically directional trenches, resulting in a ceramic body;

(d) forming on said ceramic body a multiplicity of regularly spaced horizontally directional trenches, wherein each of said trenches has a pair of side surfaces and a bottom, and runs parallel to each other in a direction normal to said plurality of vertically directional trenches;

(e) preparing a second ceramic wafer made of said electrodisplacive material and having a flat surface;

(f) treating said second ceramic wafer in accordance with said steps(b), (c) and (d);

(g) bonding said first and second ceramic wafers treated in accordance with said steps(b), (c), and (d) by using an adhesive to thereby form a ceramic block having a top and a bottom surfaces;

(h) removing said top and bottom surfaces of said ceramic block so as to obtain a pair of flat surfaces thereof until said first conductive metallic layer deposited on the side surfaces of said vertically directional trenches prepared in said step(b) is exposed, resulting in a composite structure, wherein said electrodisplacive material is separated in the vertical direction by said first conductive metallic layer and in the horizontal direction by said adhesive;

(i) forming a series of regularly spaced vertically directional grooves on one of said flat surfaces obtained in said step(h), wherein each of said grooves has a pair of side surfaces and a bottom surface, runs parallel to each other, is separated from the adjacent grooves by a barrier having a top surface and is located at an equidistance from two adjacent layers of said first conductive metallic layers;

(j) depositing a second conductive metallic layer on said side and bottom surfaces of each of said series of grooves and the top surface of each of the barriers; and (k) removing the second conductive metallic layer on the top surfaces of each of the barriers to thereby form the array of electrodisplacive actuators.

2. The method of claim 1, wherein said first conductive metallic layer in step(c) is comprised of either aluminum or silver.

3. The method of claim 2, wherein said first conductive metallic layer is obtained by using a sputtering method or a thermal evaporation method.

4. The method of claim 1, wherein said multiplicity of horizontally directional trenches in said step(d) has a depth which is equal or greater than that of said plurality of vertically directional trenches in said step(b).

5. The method of claim 1, wherein said adhesive in said step(g) is of a non-conductive material.

6. The method of claim 1, wherein said second conductive metallic layer in said step(j) is comprised either aluminum or silver.

7. The method of claim 6, wherein said second conductive metallic layer is obtained by using a sputtering method or a thermal evaporation method.

* * * * *